US008678074B1

(12) United States Patent
Jacques et al.

(10) Patent No.: US 8,678,074 B1
(45) Date of Patent: Mar. 25, 2014

(54) CONTINUOUS CASTING FURNACE FOR LONG INGOT CASTING

(71) Applicant: RTI International Metals, Inc., Niles, OH (US)

(72) Inventors: Michael P. Jacques, Canton, OH (US); Kuang-O Yu, Highland Heights, OH (US)

(73) Assignee: RTI International Metals, Inc., Niles, OH (US)

( * ) Notice: Subject to any disclaimer, the term of this patent is extended or adjusted under 35 U.S.C. 154(b) by 0 days.

(21) Appl. No.: 13/785,298

(22) Filed: Mar. 5, 2013

(51) Int. Cl.
*B22D 11/12* (2006.01)
*B22D 11/00* (2006.01)
*B23K 7/00* (2006.01)

(52) U.S. Cl.
USPC ............... 164/263; 164/415; 266/50

(58) Field of Classification Search
USPC ............. 164/460, 474, 475, 262, 263, 415; 266/48, 50
See application file for complete search history.

(56) References Cited

U.S. PATENT DOCUMENTS

| 3,764,297 | A | * | 10/1973 | Coad et al. ............... 75/10.23 |
| 4,336,078 | A | * | 6/1982 | Radtke ................... 148/197 |
| 4,463,796 | A | * | 8/1984 | Korshunov et al. ........... 164/460 |
| 4,598,761 | A | * | 7/1986 | Ishihara et al. ............... 164/263 |
| 7,470,305 | B2 | | 12/2008 | Jackson et al. |
| 7,484,549 | B2 | | 2/2009 | Jacques et al. |
| 2012/0037330 | A1 | * | 2/2012 | Popper ................. 164/460 |

* cited by examiner

*Primary Examiner* — Kevin P Kerns
*Assistant Examiner* — Steven Ha
(74) *Attorney, Agent, or Firm* — Sand & Sebolt

(57) ABSTRACT

A continuous casting furnace is configured for efficiently continuously casting ingots, including titanium alloy ingots. The furnace is configured with an internal cutter for cutting an ingot within the furnace interior chamber. The furnace typically includes a first interior chamber in which a continuous casting mold is disposed and a withdrawal chamber which is separable from the first interior chamber to facilitate withdrawal of finished ingots therefrom while casting continues within the first chamber.

19 Claims, 8 Drawing Sheets

US 8,678,074 B1

CONTINUOUS CASTING FURNACE FOR LONG INGOT CASTING

BACKGROUND OF THE INVENTION

1. Technical Field

The present invention is related generally to furnaces for casting metal and the method of using such furnaces. More particularly, the furnace is configured for the continuous casting, especially of metals such as titanium which when hot are reactive with oxygen. Specifically, the furnace includes a cutter for cutting a metal casting within the furnace and withdrawal chamber which facilitate a virtually nonstop casting process.

2. Background

There are many known configurations of continuous casting furnaces. For example, U.S. Pat. No. 7,470,305 granted to Jackson et al. discloses a furnace configured for alternating pouring from a common hearth into two continuous casting molds to form ingots in an alternating fashion, wherein two lifts are used in an alternating fashion for lowering the ingots into two separate withdrawal chambers. Each withdrawal chamber can be selectively shut off from the melting chamber in which the hearth and molds are disposed. Each withdrawal chamber has a door which can be opened to allow for the removal of the respective ingots therefrom. While the Jackson furnace provides for substantially continuous casting by the alternating pouring method, this furnace thus requires two molds, torches for each mold, two withdrawal chambers and two lifts. In addition, the Jackson furnace uses ram lifts which extend substantially below the withdrawal chambers and thus require additional vertical space for operation.

Titanium and certain other metals when hot are highly reactive with oxygen. Thus, it is desirable when casting such metals to prevent exposure of the heated ingots to air outside the furnace. U.S. Pat. No. 7,484,549 granted to Jacques et al. discloses a continuous casting furnace for casting such reactionary metals using a glass or other coating on the ingot to protect the hot ingot from exposure to oxygen after exiting the furnace chamber. While such a coating does prevent exposing the hot ingot to oxygen, this method requires a configuration for applying the glass coating and controls to properly apply the coating to the ingot. In addition, it may be desirable in certain instances to produce an ingot free from a glass or other coating on the outer perimeter of the ingot.

There is a need in the art for a relatively low cost furnace which provides for high efficiency continuous casting. The present invention provides such a furnace while eliminating various structure and processes involved with other prior art furnaces such as those discussed above.

BRIEF SUMMARY OF THE INVENTION

In one aspect, the invention may provide a continuous casting furnace comprising: a furnace interior chamber; a continuous casting mold disposed in the furnace interior chamber and adapted to form a metal casting; a metal casting pathway extending away from the mold and adapted to allow the metal casting to move downstream from the mold; and a cutter disposed in the furnace interior chamber adjacent the metal casting pathway and adapted to cut the metal casting.

BRIEF DESCRIPTION OF THE SEVERAL VIEWS OF DRAWINGS

DETAILED DESCRIPTION OF THE INVENTION

Figure 1:
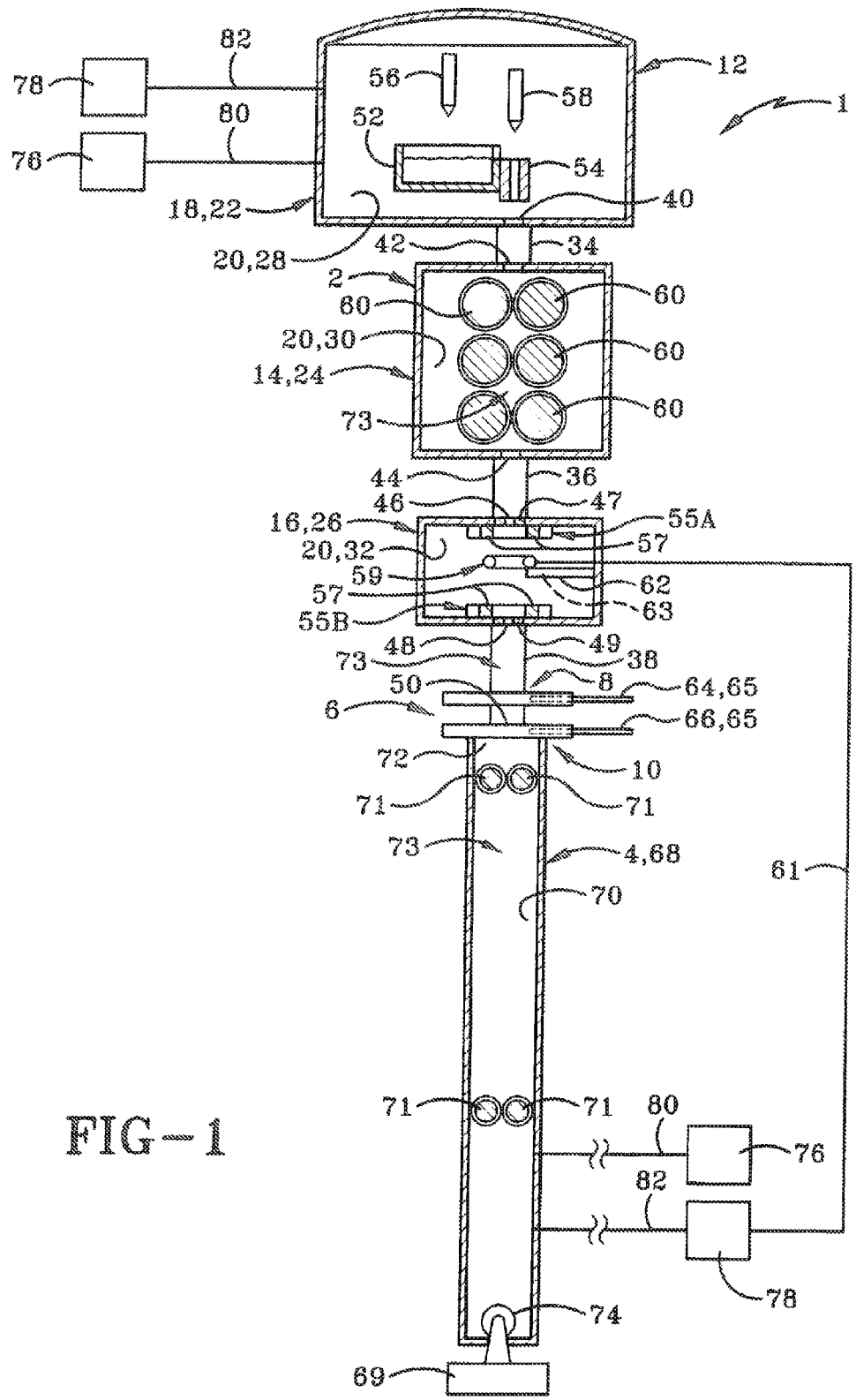
FIG. 1 is a diagrammatic sectional view of a first example continuous casting furnace of the present invention.

The continuous casting furnace of the present invention is shown generally at 1 in FIG. 1. Furnace 1 includes a first or upper chamber 2 and a second or lower chamber 4 which is downstream of first chamber 2. An isolation assembly 6 is positioned between chambers 2 and 4 at or along a lower downstream end 8 of first chamber 2 and at or along an upper upstream end 10 of second chamber 4. In the exemplary embodiment, lower chamber 4 is movable relative to upper chamber 2.

Upper chamber 2 includes several sub-chambers or chamber sections including a melting sub-chamber or section 12, a roller sub-chamber or section 14 and a cutting sub-chamber or section 16. First chamber 2 includes a rigid first or upper chamber wall 18 which defines a first or upper interior chamber 20 and which includes a rigid melting sub-chamber or section wall 22, a rigid roller sub-chamber or section wall 24 and a rigid cutting sub-chamber or section wall 26. Wall 22 defines an interior melting space 28, wall 24 defines an interior roller space 30, and wall 24 defines an interior cutting space 32. Upper chamber wall 18 further includes a first or upper passage wall 34, a second or intermediate passage wall 36, and a third or lower passage wall 38. Each of walls, 34, 36 and 38 is typically in the form of a tube or pipe. Space 20 generally extends from the top of melting space 28 to adjacent the bottom of lower passage wall 36.

An upper or upstream end of upper passage wall 34 is rigidly connected to a bottom or downstream end of wall 22 of melting section 12 at a rigid connection, and a lower or downstream end of upper passage wall 34 is rigidly connected to a top or upstream end of wall 24 of roller section 14 at a rigid connection. Likewise, an upper or upstream end of intermediate passage wall 36 is rigidly connected to a bottom or downstream end of wall 24 of roller section 14 at a rigid connection, and a lower or downstream end of intermediate passage wall 36 is rigidly connected to a top or upstream end of wall 26 of cutting section 16 at a rigid connection. An upper or upstream end of lower passage wall 38 rigidly connected to a bottom or downstream end of wall 26 of cutting section 16 at a rigid connection. Lower passage wall 38 extends downwardly therefrom to a lower or downstream end. Isolation assembly 6 is connected to lower passage wall 38 adjacent the lower or downstream end thereof.

Melting section wall 22 along a bottom wall portion thereof defines a bottom exit opening 40 vertically aligned with and in fluid communication with an upper or upstream end of the passage defined by upper passage wall 34. Roller section wall 24 along a top wall portion thereof defines a top entrance opening 42 vertically aligned with and in fluid communication with a lower or downstream end of the passage defined by upper passage wall 34. Roller section wall 24 along a bottom wall portion thereof defines a bottom exit opening 44 vertically aligned with and in fluid communication with an upper or upstream end of the passage defined by intermediate passage wall 36. Cutting section wall 26 along a top wall portion thereof defines a top entrance opening 46 vertically aligned with and in fluid communication with a lower or downstream end of the passage defined by intermediate passage wall 36. Cutting section wall 26 along a bottom wall portion thereof defines a bottom exit opening 48 vertically aligned with and in fluid communication with an upper or upstream end of the passage defined by lower passage wall 38. The passage defined by lower passage wall 38 has a bottom exit opening 50.

An annular upper or top barrier 47 within space 20 is mounted on an upper or upstream portion of wall 26 of cutter section 16 adjacent the downstream end of the passage of intermediate wall 36. An annular lower or bottom barrier 49 within space 20 is mounted on a lower or downstream portion of wall 26 of cutter section 16 adjacent the upstream end of the passage of lower wall 38. Each of barriers 47 and 49 has an inner perimeter defining a through opening through which the metal casting passes as the metal casting moves downwardly during the casting operation of furnace 1. Each of these inner perimeters has a size and shape that is substantially the same as that of the inner perimeter of mold 54 and the outer perimeter of the metal casting formed in mold 54, or may be a little larger. Where the inner perimeter of the barrier is the same as the outer perimeter of the metal casting, the barrier may also be called a wiper since it will engage the metal casting outer perimeter when the casting extends through the barrier/wiper. The inner perimeter of each barrier 47, 49 may, for instance, be sized such that no point of the inner perimeter of the barrier is spaced more than a normal distance of 1/16, 1/8 or 1/4 inch outwardly of the outer perimeter of the metal casting when the metal casting is received through the annular barrier. Thus, where the metal casting or ingot is cylindrical, the diameter of the inner perimeter of the annular barrier 47 or 49 may, for example, be limited to being the same as the inner diameter of mold 54 and outer diameter of the metal casting, or no more than 1/8, 1/4 or 1/2 inch greater than the inner diameter of mold 54 and the outer diameter of the metal casting. Each of barriers 47 and 49 may be, for example, in the form of a high-temperature compressible seal or packing, in the form of metal blades or any other suitable configuration.

Furnace 1 further includes within interior space 28 of melting section 12 a main or melting hearth 52 defining a melting cavity, a continuous casting mold 54 having an inner perimeter defining a through casting cavity extending from top to bottom thereof, a melting hearth heat source 56 and a mold heat source 58. Hearth 52 is typically water-cooled and is in fluid communication with the top of mold 54 typically via an overflow of hearth 52. Heat sources 56 and 58 are typically plasma torches although other heat sources may be used under suitable conditions. In the exemplary embodiment, hearth torch 56 is positioned directly above the melting cavity defined by hearth 52 and mold torch 58 is positioned directly above the mold cavity defined by mold 54.

Several sets of upper ingot rollers 60 are rotatably mounted on wall 24 within space 30 of roller section 14 and form an upper metal casting or ingot lift or lowering mechanism. Each set includes a pair of rollers 60 which rollingly engage the outer perimeter of the metal casting and clamp therebetween the metal casting as it moves downwardly from mold 54 within section 14. A cutter or cutting device 62 is disposed within space 32 of cutting section 16. In the exemplary embodiment, metal casting cutter 62 is typically a physical or mechanical cutter having a frame and a rigid cutting member 63 movably mounted on the frame. For example, cutter 62 may be a shear type cutter with the cutting member in the form of a rigid shear member or an abrasive cutter with the cutting member in the form of an abrasive cutting wheel or blade which is typically rotatably mounted or movable in an oscillating back and forth fashion. When the atmosphere within the furnace needs to be inert, as with the use of plasma torches and/or with casting metals which when hot are reactive with oxygen, the cutting device will not use a cutting torch which uses oxygen. In addition, the atmosphere within the furnace typically should be free of water and thus the cutting device typically does not use a water jet. Ingot cutter 62 may also include a plasma torch cutter within an inert gas atmosphere such that the cutting member 63 is a plasma plume when the plasma torch is ignited.

Figure 2:
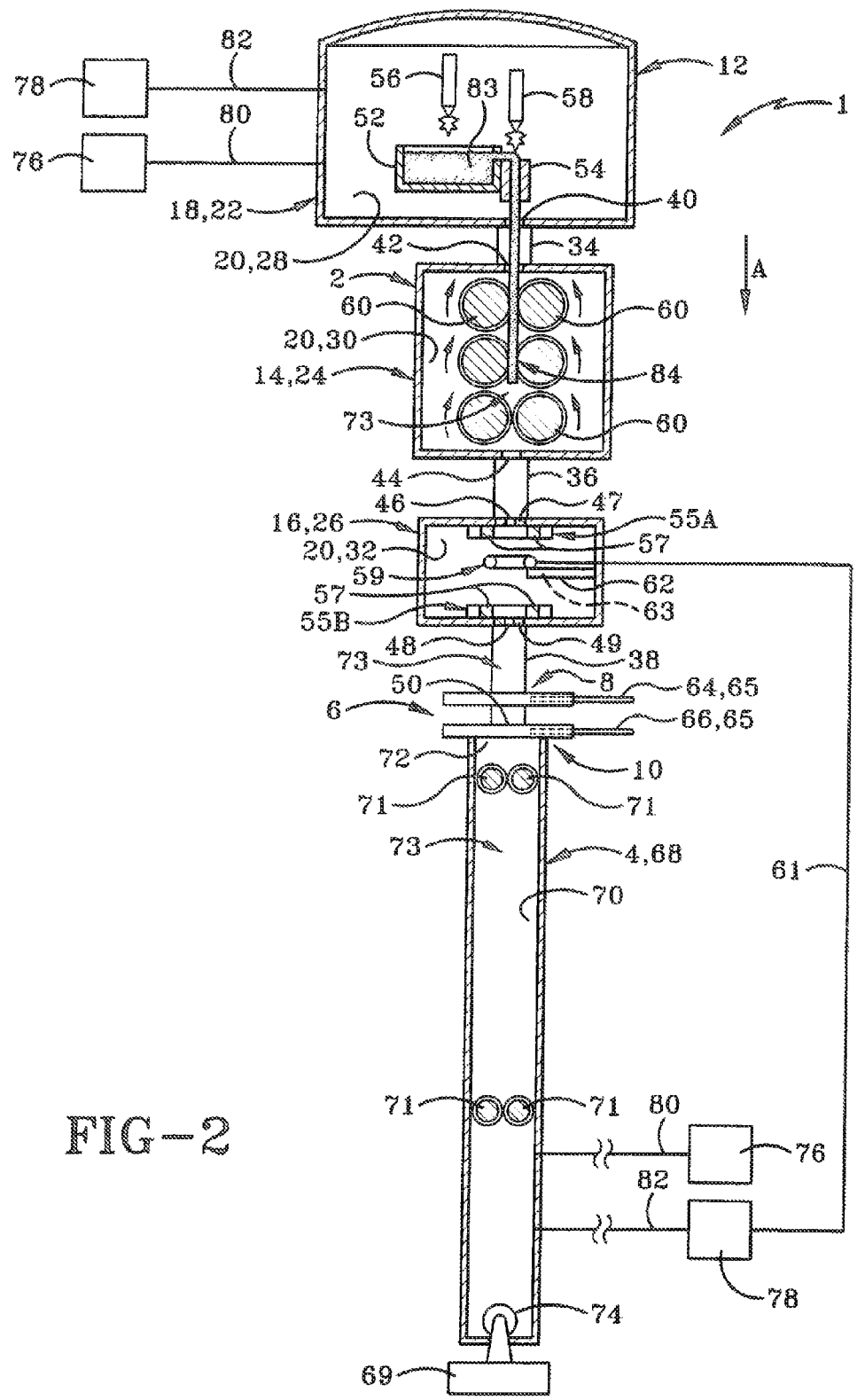
FIG. 2 is similar to FIG. 1 and shows an early stage of forming the metal casting, which extends from the mold into the roller section of the upper chamber.
Figure 3:
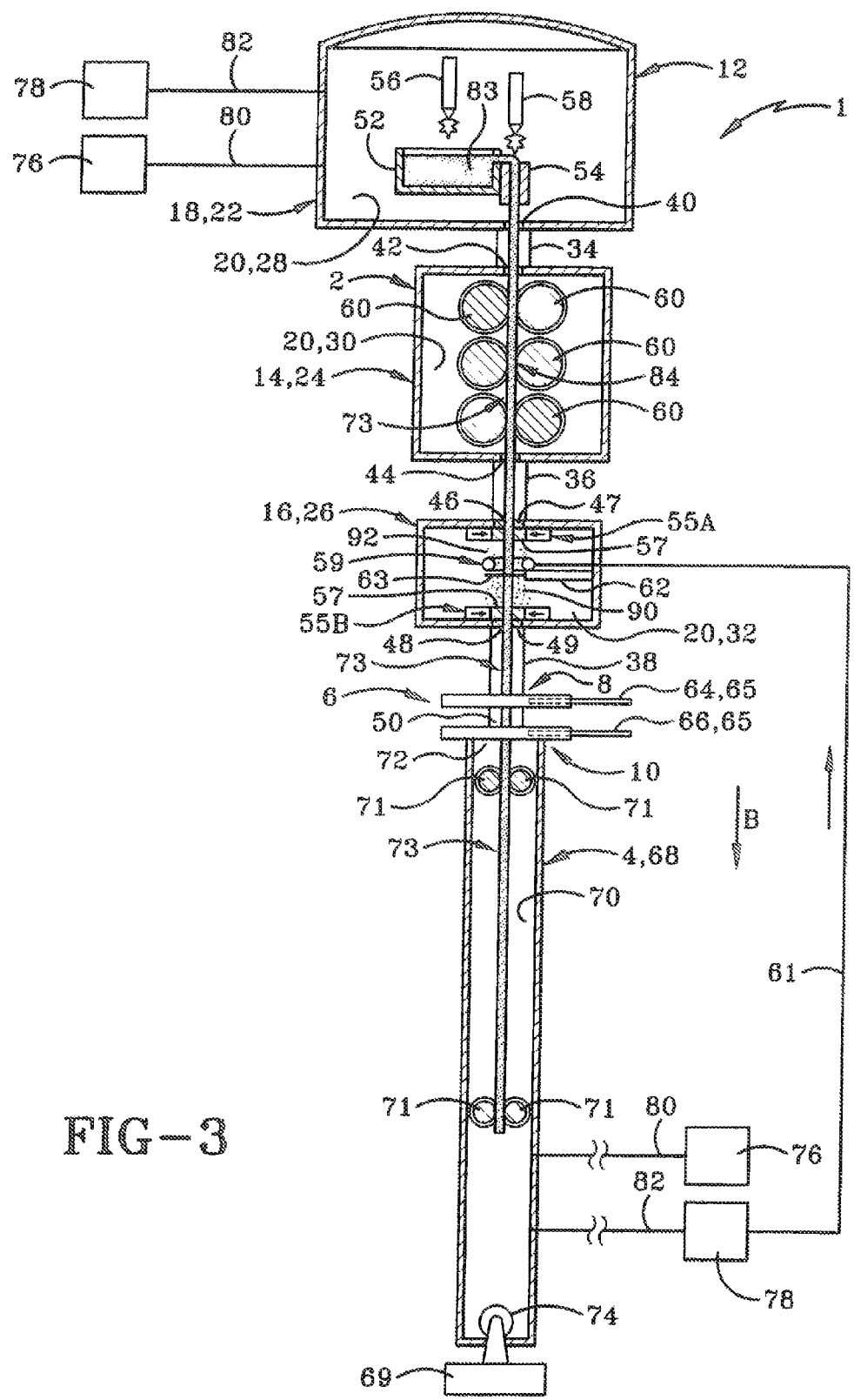
FIG. 3 is similar to FIG. 2 and shows the metal casting at a subsequent stage of formation extending from the mold through the roller section and cutting section of the upper chamber into the lower withdrawal chamber in its receiving position, and being cut by the cutter in the cutter section.
Figure 4:
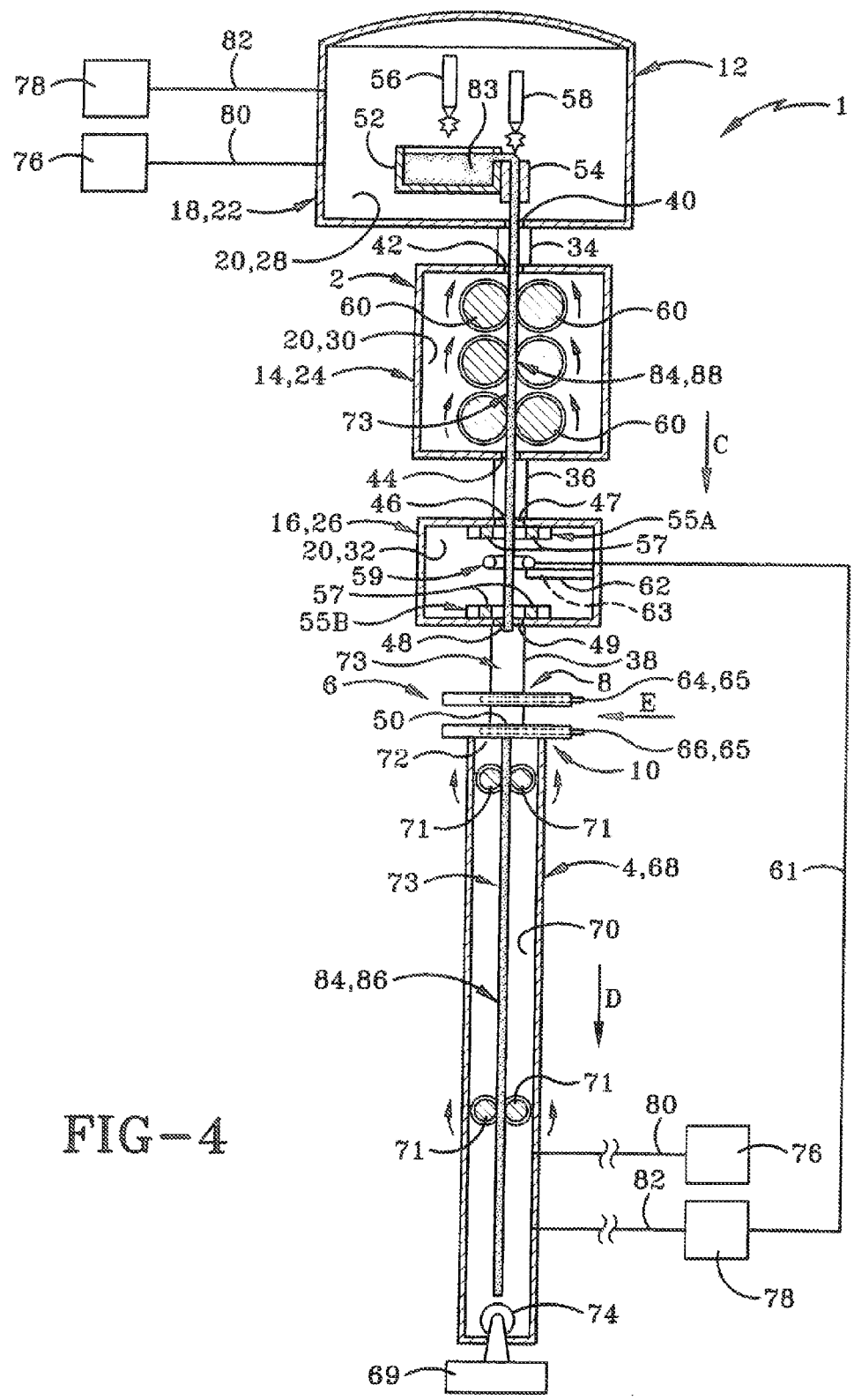
FIG. 4 is similar to FIG. 3 and shows the metal casting having been cut in the cutting section to form a finished ingot which has been lowered into the lower withdrawal chamber in its receiving position and a remaining unfinished ingot extending from the mold through the roller and cutting sections of the upper chamber.

One or more clamping assemblies may also be disposed within space 32 of cutting section 16. In the example embodiment, an upper clamping assembly 55A is mounted within cutting section 16 adjacent and upstream or higher than cutter 62, while a lower clamping assembly 55B is also mounted within cutting section 16 adjacent and downstream or lower than cutter 62. Each of clamping assemblies 55 has two or more clamping members 57 which are movable between clamping and non-clamping positions. The non-clamping position is shown in FIGS. 1, 2, 4 and 5, while the clamping position is shown in FIG. 3. Clamping assemblies 55 may be in the form of a steady rest, of which there are numerous types. The clamping assembly may be powered by any suitable drive mechanism. In the exemplary embodiment, the drive mechanism is a hydraulic drive mechanism for hydraulically moving the clamping members 57 between their clamping and non-clamping positions. One example of a hydraulically powered clamping mechanism is sometimes referred to as a hydraulic lobster claw which includes a pair of claws or clamping members which are pivotally mounted to move between the clamping and non-clamping positions. However, clamping members 57 may for example move linearly between the clamping and non-clamping positions.

A temperature control assembly or unit 59 may also be disposed within cutting section 16 in space 32. Unit 59 may include one or both of a heating device and a cooling device. Unit 59 may have an annular configuration such that unit 59 circumscribes the metal casting when it passes therethrough during the casting process. The heating device of unit 59 may include an induction coil which circumscribes the metal casting and the pathway along which it passes. The heating device may also include resistance heating elements which circumscribe or are spaced generally around the metal casting or the pathway along which it travels. The cooling device of unit 59 may be an inert gas cooling device which supplies or blows inert gas along the outer perimeter of the metal casting within space 32 of cutting section 16. For example, the inert gas cooling device may include a cooling ring or an annular pipe which circumscribes the metal casting when received through the pipe and the pathway along which the metal casting travels. The annular pipe may be formed with a plurality of exit ports or nozzles directed radially inwardly toward the outer perimeter of the metal casting. The cooling device may be supplied by an inert gas line 61 extending from the nozzle assembly or annular pipe illustrated generally at 59 to one of the inert gas sources such as the lower source 78 shown. A blower may be supplied adjacent source 78 or elsewhere to blow inert gas from source 78 through line 61 to the cooling device or assembly of unit 59. Thus, the inert gas source 78, the blower, inert gas line 61, the nozzle assembly or cooling ring and the metal casting pathway or portion of space 32 adjacent the exit openings or nozzles are all in fluid communication with one another.

Isolation assembly 6 includes a first or upper isolation valve 64 and a second or lower isolation valve 66 which is directly below and downstream of upper valve 64. Valves 64 and 66 each has an open and closed position. More particularly, each of valves 64 has a door 65 with a seal which in the closed position (FIGS. 4, 5) provides a gastight or essentially gastight seal across the passage of lower wall 38 and which in the open position (FIGS. 1-3) breaks the corresponding gastight seal and opens communication through the passage of lower passage wall 38 between upper and lower chambers 2 and 4. Valves 64 and 66 are independently operable to move their respective doors between the open and closed positions.

Lower chamber 4 comprises a lower chamber wall 68 which is typically in the form of a cylindrical tube or pipe and defines a lower chamber ingot receiving interior space or chamber 70. Interior chamber 70 has a top entrance opening 72 at or adjacent the top of wall 68 and lower isolation valve 66. Entrance opening 72 is typically defined by lower valve 66 in its open position. A plurality of sets of lower ingot rollers 71 are rotatably mounted on wall 68 within space 70 of lower chamber 4 and form a lower metal casting or ingot lift or lowering mechanism, which may also serve as a metal casting or ingot withdrawal mechanism or part of such a withdrawal mechanism. Each set includes a pair of rollers 71 which rollingly engage the outer perimeter of the metal casting and clamp therebetween the metal casting as it moves downwardly within lower chamber 4. Lower chamber 4 is movable between a joined or connected ingot receiving position shown in FIGS. 1-4 and a separated or disconnected ingot withdrawal position shown in solid lines in FIG. 5. In the ingot receiving position, upper end 10 of lower chamber 4 is connected or secured to lower end 8 of upper chamber 2 with upper entrance opening 72 vertically aligned with bottom exit opening 50 so that upper and lower interior chambers 20 and 70 are in fluid communication with one another and so that interior chamber 70 is configured to receive an ingot from upper interior chamber 20 via openings 50 and 72. In the exemplary embodiment, lower chamber 4 is vertically movable via a lower chamber lift 69 or drive mechanism which may be in the form of or include any suitable lift for raising and lowering chamber 4 along with rollers 71 and any other corresponding components mounted thereon and the finished ingot (discussed further below) when carried therein. Lift 69 has raised and lowered positions. Lower chamber 4 is mounted on or carried by lift 69. Thus, lift 69 is operatively connected to chamber 4 and configured to move chamber 4 between the joined or connected ingot receiving position shown in FIGS. 1-4 when lift 69 is in the raised position and the separated or disconnected non-withdrawal position shown in dashed lines in FIG. 5 when lift 69 is in the lowered position. This non-withdrawal position might also be referred to as a first separated or disconnected position or one of a plurality of separated or disconnected positions.

Figure 5:
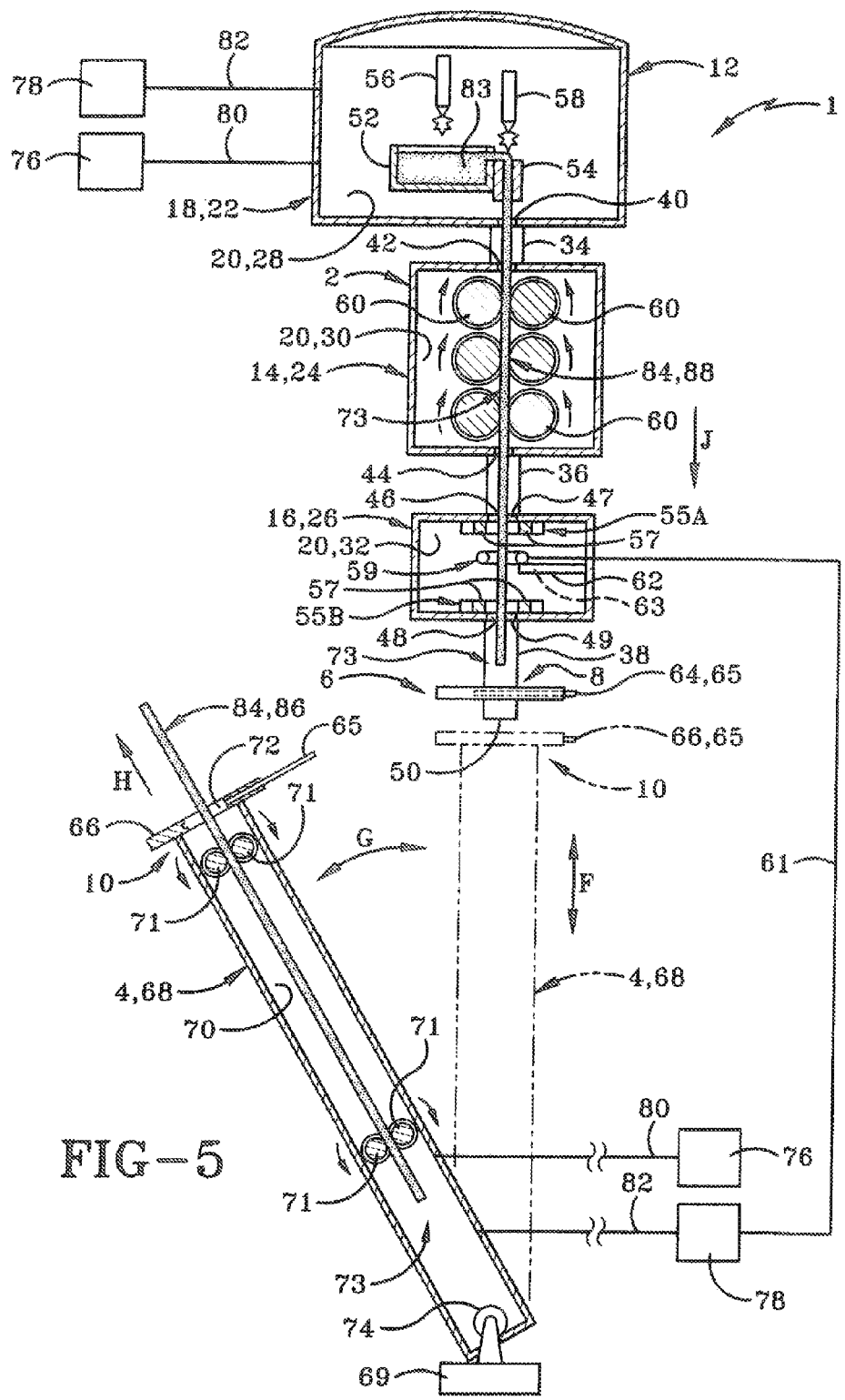
FIG. 5 is similar to FIG. 4 and shows the lower withdrawal chamber having moved to its withdrawal position and the finished ingot being withdrawn from the lower withdrawal chamber.

Lower chamber 4 adjacent its lower end is pivotally mounted on a pivot 74 to move between the first disconnected position shown in dashed lines in FIG. 5 and the ingot withdrawal position shown in solid lines in FIG. 5. This withdrawal position might also be referred to as a second separated or disconnected position or another one of the plurality of separated or disconnected positions. In the disconnected non-withdrawal position, upper or upstream end 10 of lower chamber 4 and lower valve 66 is disconnected from and adjacent lower or downstream end 8 of wall 38 of upper chamber 2 and upper isolation valve 64 of isolation assembly 6. In the disconnected withdrawal position, upper or upstream end 10 of lower chamber 4 is disconnected from and distal lower or downstream end 8 of wall 38 of upper chamber 2 and upper valve 64. In the disconnected non-withdrawal position, a finished ingot cannot be withdrawn from lower chamber 70 into the external atmosphere because there is not sufficient space between the top of lower chamber 4 and the bottom of upper chamber 2 to accommodate a finished ingot. In the disconnected withdrawal position, a finished ingot can be withdrawn from lower chamber 70 into the external atmosphere. Top entrance opening 72 in the withdrawal position serves as an exit opening for withdrawing or removing a finished ingot from lower chamber 4.

Lift 69 may also be or include a drive mechanism operatively connected to lower chamber 4 for pivotally moving lower chamber 4 between the lowered non-withdrawal position and the withdrawal position. Lift 69 may, for instance, be hydraulically or pneumatically operated or use a hydraulic or pneumatic motor, or may use an electric motor both for lifting and pivoting. Lift 69 may include a screw lift configuration, rack and pinion, scissors jack or any other lift know in the art suitable for the purpose. The drive mechanism may also, for instance, include a rotational drive for driving the rotation or pivoting of chamber 4. Although lift 69 is shown as one unit or assembly for both lifting and driving the pivotal motion of lower chamber 4 back and forth between the non-withdrawal and withdrawal positions, a drive mechanism separate from lift 69 may be used to drive this pivotal movement.

Furnace 1 defines a metal casting pathway 73 which extends downwardly from the bottom of mold 54 through a portion of melting space 28, the upper passage of upper passage wall 34, roller space 30, the intermediate passage of intermediate passage wall 36, cutting space 32, the lower passage of lower passage wall 38 and interior chamber 70 of lower chamber 4. In the exemplary embodiment, pathway 73 thus is a straight vertical path which extends straight down from melting section 12 of upper chamber 2 into lower chamber 4 to adjacent the lower end of interior chamber 70 and wall 68. Metal casting pathway 73 has the same cross sectional shape and size as the metal casting which is cast within and extends downwardly from mold 54 during the casting process. Each pair of upper rollers 60 in a given set is on opposite sides of pathway 73 such that the surfaces of the circular outer perimeters of upper rollers 60 which face one another and pathway 73 abut pathway 73. Similarly, each pair of lower rollers 71 in a given set is on opposite sides of pathway 73 such that the surfaces of the circular outer perimeters of lower rollers 71 which face one another and pathway 73 abut pathway 73. Cutting member 63 of cutter 62, such as a shear member or an abrasion member/blade, is movable into and out of pathway 73. Cutting member 63 is shown within pathway 73 in FIG. 3 and outside of pathway 73 in the remaining figures. Doors 65 of isolation valves 64 and 66 are likewise movable into and out of pathway 73 so that each door 65 is within pathway 73 in the closed position (FIGS. 4, 5) and outside of pathway 73 in the open position (FIGS. 1-3).

The size and shape of the inner perimeter of each barrier 47 and 49 was discussed further above. It is further noted that the inner perimeter of each of these barriers may thus have the same shape as that of the outer perimeter of pathway 73 as well as the same size or a somewhat larger size than that of pathway 73. Thus, when the inner perimeter of a given barrier is larger than the outer perimeter of pathway 73, this size may fall within the same ranges relative to the outer perimeter of pathway 73 as with respect to the inner perimeter of mold 54 and outer perimeter of the metal casting as discussed above. When clamping assemblies 55 are in the clamping position, the clamping surfaces of clamping members 57 abut the outer perimeter of pathway 63, whereas in the non-clamping position, these clamping surfaces are spaced outwardly of the outer perimeter of pathway 73.

Furnace 1 further includes one or more evacuation pumps 76 and inert gas sources 78 which are in fluid communication respectively with upper interior chamber 20 and lower interior chamber 70 via suitable vacuum lines 80 and backfill lines 82. Thus, one vacuum line 80 is connected at one end to one of pumps 76 and at an opposite end to upper chamber wall 18. Another vacuum line 80 is connected at one end to one of pumps 76 and at an opposite end to lower chamber wall 68. Similarly, one backfill line 82 is connected at one end to one of sources 78 and at an opposite end to upper chamber wall 18. Another backfill line 82 is connected at one end to one of sources 78 and at an opposite end to lower chamber wall 68.

In operation, furnace 1 may be used to continuously cast any type of metal to form a metal casting which is cut to form finished ingots. Furnace 1 is particularly useful in casting titanium alloy ingots or other metals which when hot are reactive with oxygen. Furnace 1 may be used to form ingots having any chosen cross sectional shape and size, which is defined by the shape and size of the inner surface of mold 54. Commonly, ingots are cast in cylindrical form having a diameter of about five inches. However, in many instances, smaller diameter ingots are desired to produce as-cast diameters without subsequent deformation processes to reduce the diameter before delivery to a given customer.

In the exemplary embodiment, furnace 1 is operated with an inert gas atmosphere within upper and lower chambers 2 and 4. In the exemplary embodiment, an inert gas atmosphere is defined herein as an atmosphere which is essentially all or only inert gas, and thus essentially free of oxygen, nitrogen and all gases other than inert gases, as will be understood by one skilled in the art. Initially, isolation valves 64 and 66 are typically in their open positions and lower chamber 4 is in its receiving position such that chambers 2 and 4 are connected in a sealed fashion so that interior chambers 20 and 70 are in fluid communication with one another and together form a single furnace interior chamber which is sealed from external atmosphere outside of chambers 2 and 4. In this initial configuration, one or more evacuation pumps 76 are operated to evacuate this single furnace interior chamber, thus removing all or essentially all of the air therefrom via lines 80 to place this interior chamber under vacuum. Then, this single furnace interior chamber is backfilled with inert gas, typically helium or argon, from one or more sources 78 via one or more lines 82.

Water-cooled hearth 52 is fed with solid metal to be melted using a standard feed mechanism which is not shown. Hearth torch 56 is ignited (FIG. 2) within the inert gas atmosphere to heat and melt the metal to form molten metal 83 within the melting cavity of hearth 52. Molten metal 83 is then poured from hearth 52 into the top of mold 54 atop a starter stub (not shown) to begin forming a metal casting 84. Mold torch 58 is also ignited (FIG. 2) to supply heat atop the metal with mold 54 to control the solidification rate within the water-cooled mold 54. Metal casting 84 is initially lowered (Arrow A in FIG. 2) with rollers 60. More particularly, each pair of rollers 60 clamps metal casting 84 therebetween, and rollers 60 are rotated (as shown by corresponding arrows) by a drive mechanism at a desired controlled rate to lower metal casting 84 at a corresponding controlled rate. Several pairs of rollers 60 are used whereby their clamping function keeps the heated metal casting 84 straight as it cools. Rollers 60 thus serve as a metal casting or ingot lift or lowering mechanism for lowering casting 84.

Molten metal 83 is continuously poured atop the forming metal casting 84 and solidified while continuously being lowered so that metal casting 84 gradually increases in length. Portions of casting 84 thus move downstream along pathway 73 from mold 54 through the lower portion of melting section 12, the passage of upper wall 34, roller section 14, the passage of intermediate wall 36, barrier 47, cutting section 16, barrier 49, the passage of lower wall 38, open isolation valves 64 and 66 and lower chamber 4. As casting 84 moves downstream, the outer perimeter of casting 84 may slidably engage the inner perimeters of barriers 47 and 49 (FIGS. 4, 5) along a respective continuous annular interface between this outer perimeter and each barrier inner perimeter, or may pass within and adjacent the inner perimeter of each barrier 47, 49 without contacting these inner perimeters. As casting 84 moves into lower chamber 4, lower rollers 71 rollingly engage the outer perimeter of casting 84 as rollers 71 rotate (arrows in FIG. 4). Like rollers 60, each pair of rollers 71 clamps metal casting 84 therebetween. The rotation of rollers 71 may be driven by a drive mechanism or may be idler rollers and thus passive, that is, driven only by contact with the outer perimeter of casting 84 as casting 84 moves downwardly. When rollers 71 are driven, the rotational rate of rollers 71 is controlled to coordinate with the rotational rate of rollers 60 to provide the associated rate of movement of casting 84 in the downstream direction.

Eventually, casting 84 is sufficiently long and lowered sufficiently so that the lower end of casting 84 moves downwardly into lower chamber 4 (FIG. 3) through open isolation valves 64 and 66 and openings 50 and 72 to a height at which the lower end of casting 84 and cutting member 63 define therebetween a desired length for a finished ingot. At this point, the rotation of rollers 60 and 71 is typically stopped to stop the lowering movement of casting 84. Clamping assemblies 55 are operated to move clamping members 57 from the non-clamping position to the clamping position so that the clamping members of the upper assembly 55A securely clamp the outer perimeter of metal casting 84 higher than or upstream of cutter 62 and the clamping members 57 of lower assembly 55B clamp the outer perimeter of metal casting 84 downstream of or lower than cutter 62. Cutter 62 is operated while casting 84 is clamped and stationary to cut casting 84 typically along a substantially horizontal plane to form a lower metal casting or finished ingot 86 which is separated from and below an upper metal casting or unfinished ingot 88, which is the remaining portion of metal casting 84 which extends down from mold 54 within an upper length of pathway 83 to its newly formed bottom at cutter 62. More particularly, cutting member 63 of cutter 62 moves from a non-cutting position (FIG. 2) outside casting pathway 73 to a cutting position (FIG. 3) within pathway 73. While casting 84 is stopped and cutter 62 cuts through casting 84, each of barriers 47 and 49 maintains contact along the continuous annular interface between each barrier and the outer perimeter of casting 84 or is adjacent said outer perimeter. During the cutting process, cutter 62 produces cuttings 90 and dust 92. Cuttings 90 fall from cutter 62 while dust 92 may fall or float within the inert atmosphere within space 32 of cutting section 16. Cuttings 90 are typically in the form of particulate matter, mostly particles of metal cut from metal casting 84.

Depending on various circumstances such as the type of cutter being used and the type of ingot being formed, temperature control device 59 may be operated to either heat or cool metal casting 84 in the area adjacent cutter 62. Where it is desired to cool the ingot adjacent cutter 62, the cooling apparatus may be operated such as by operating the blower associated with the lower inert gas source 78 to blow inert gas through line 61 to the cooling device of unit 59 such that the inert gas, such as argon or helium, blows along the outer perimeter of metal casting 84 adjacent cutter 62. When this cooling process brings the temperature of casting 84 adjacent cutter 62 to the desired temperature, cutter 62 will then be operated to cut the casting as noted above. Alternately, unit 59 may be operated to heat the metal casting, such as by providing electric power to an induction coil and/or to electric resistance elements to heat the metal casting in the area adjacent cutter 62. By way of example only, the ingot may be heated adjacent cutter 62 to a relatively high temperature (such as 1500° F.), especially when using a hydraulic shear-type cutter in order to facilitate this type of cutting of the casting.

Due to the above-noted contact or interface between barrier 47 and casting 84, or the close proximity between barrier 47 and casting 84, when casting 84 is stationary and when casting 84 is being lowered, barrier 47 serves as a dust or dust particle barrier to block or substantially prevent dust or dust particles 92 from the cutting process from moving upwardly from space 32 upstream past barrier 47 into the passages of intermediate and upper walls 36 and 34, and spaces 28 and 30 of melting section 12 and roller section 14, which would otherwise occur absent barrier 47. Due to the above-noted contact or interface between barrier 49 and casting 84, or the close proximity between barrier 49 and casting 84, when casting 84 is stationary and when casting 84 is being lowered, barrier 49 serves as a dust/dust particle and/or cuttings barrier to block or substantially prevent dust and cuttings from the cutting process from falling from space 32 downstream past barrier 49 into the passage of lower wall 38, onto isolation valves 64 and 66, and into interior chamber 70 of lower chamber 4. Barrier or wiper 47 thus substantially prevents contamination within furnace 1 upstream of or above cutting section 16, and wiper or barrier 49 thus substantially prevents contamination within furnace downstream of or below cutting section 16. In particular, barrier 49 thus helps to keep isolation valves 64 and 66 and rollers 71 in proper operating condition by preventing the falling of dust 92 or cuttings 90 from cutter 62 onto these isolation valves and rollers, which would otherwise occur absent barrier 49. Cutter section 16 typically includes a sealed door which may be opened when furnace 1 is not operating to allow the cuttings to be cleaned out of cutter section 16 and also to allow barriers 47 and 49 to be removed and replaced when worn past usefulness.

During the cutting process, in addition to clamping assemblies 55, upper rollers 60 clamp the upper section of casting 84 and lower rollers 71 clamp the lower section of casting 84 to secure casting 84 in its stationary state. Once casting 84 has been completely cut in two by cutter 62 to form unfinished and finished ingots 86 and 88 (FIGS. 4, 5) and clamping assemblies 55 have moved back to their non-clamping positions, upper rollers 60 clamp unfinished ingot 88 to secure ingot 86 and lower rollers 71 clamp finished ingot 86 to secure ingot 88. After the cut is complete, cutting member 63 of cutter 62 is controlled to quickly move from its cutting position (FIG. 3) within pathway 73 to its non-cutting position (FIG. 4) outside pathway 73. Upper rollers 60 are then rotated again (corresponding arrows in FIG. 4) to re-start the lowering (Arrow C in FIG. 4) of the metal casting remaining portion or unfinished ingot 88 as the casting process continues with the pouring of molten metal 83 from hearth 52 into mold 54.

Stopping the downward movement of casting 84 for purposes of cutting it may be very brief. For instance, cutting a metal casting having a two-inch diameter may be achieved, for example, in about five seconds and typically in no more than about ten seconds. In this case, casting 84 may need to be kept stationary for a period such as the about five seconds or no more than about ten seconds. Of course, cutting larger ingots takes longer. For instance, a typical casting having a five-inch diameter typically takes about 75 seconds and typically no more than about 90 seconds. In this case, casting 84 may need to be kept stationary for a period such as the about 75 seconds or no more than about 90 seconds. Especially when the cutting process is brief, the pouring of molten metal 83 may continue during the cutting process even when cutter 62 does not move vertically or in the downstream direction. In addition, it is noted that cutter 62 and clamping assemblies 55 may be mounted to move in the downstream direction during the cutting process at the same rate as the downstream movement of casting 84 so that the casting process can be truly continuous during normal operation of furnace 1, that is, without stopping the lowering of metal casting 84 and without stopping the pouring of molten metal 83 from hearth 52 into mold 54 to continue forming the metal casting. Such simultaneous downward movement of cutter 62 and metal casting 84 is illustrated by Arrow B in FIG. 3.

Whether or not the downward movement of metal casting continues or is stopped during the cutting process, lower rollers 71 secure and control the lowering (Arrow D in FIG. 4) of finished ingot 86 after the cut is complete. More particularly, rollers 71 are rotated (corresponding arrows in FIG. 4) to lower finished ingot 86 more rapidly than the lowering rate of unfinished ingot 88 until finished ingot 86 is entirely within lower interior chamber 70. At this stage, isolation valves 64 and 66 are then closed by moving (Arrow E in FIG. 4) each door 65 from its open to its closed position, whereby the closing of upper valve 64 forms a sealed upper interior chamber 20 still filled with inert gas, and the closing of lower valve 66 forms a sealed lower interior chamber 70 which is separate from upper interior chamber 20 and still filled with inert gas. Upper valve 64 remains closed and an inert gas atmosphere is maintained in upper chamber 20 during the entire period that lower chamber 70 is separated from upper chamber 20. The closing of valves 64 and 66 also forms therebetween a small sealed chamber which initially maintains an inert gas atmosphere.

Once the two isolation valves are closed to form the two separate sealed chambers 20 and 70, the casting of unfinished ingot 88 continues in the inert gas atmosphere within upper interior chamber 20, and furnace 1 is controlled to prepare for removal of finished ingot 86. In particular, while isolation valves 64 and 66 remain closed, the casting of unfinished ingot 88 continues and lower chamber 4 including wall 68 and lower valve 66 is separated or disconnected from upper chamber 2, thus breaking a gastight or substantially gastight seal between chambers 2 and 4 (which exists when chambers 2 and 4 are joined in the connected receiving position), and chamber 4 is moved to its withdrawal position (solid lines in FIG. 5) such that upstream end 10 of lower chamber 4 is disconnected from and moved away from downstream end 8 of upper chamber 2. This disconnection and breaking of the seal is typically done by lowering or pulling the entire lower chamber 4 downwardly away from upper chamber 2, which typically remains stationary.

In the exemplary embodiment, there is typically an annular face seal at the bottom of lower passage wall 38 or the top of lower valve 66 which forms the gastight or substantially gastight seal between upper and lower chamber 20 and 70 when upper and lower chambers 2 and 4 are joined to one another. This sealed joint is thus typically formed simply by upward pressure on lower chamber 4 to force lower valve 66 against the face seal if mounted on passage wall 38 or to force the face seal if mounted on lower valve 66 against the lower end of passage wall 38. The lowering of chamber 4 thus breaks the gastight seal by moving lower valve 66 out of contact with the face seal (if mounted on wall 38) or moving the face seal (if mounted on valve 66) out of contact with passage wall 38.

More particularly, lift 69 is operated to lower (Arrow F in FIG. 5) chamber 4 a short distance sufficient to separate upstream end 10 and lower valve 66 from downstream end 8 and upper valve 64, and then pivotally moving (Arrow G in FIG. 5) upstream end 10 about pivot 74 laterally away from lower end 8. This lateral or sideways movement of upper end 10 is thus at an angle to the downward or downstream direction of movement of metal casting 84 within upper chamber 2 during casting and within lower chamber 4 when in the receiving position. This movement of upper end 10 in the exemplary embodiment is thus initially horizontal and then begins to move laterally and downwardly via the pivoting movement of lower chamber 4.

Lower valve 66 is opened so that entrance opening 72 is exposed to external atmosphere. Opening 72 then serves as an exit opening through which finished ingot 86 may be removed (Arrow H in FIG. 5) from interior chamber 70 as lower rollers 71 are operated to rotate (corresponding arrows in FIG. 5) in a direction opposite that used during the lowering of ingot 88. It is noted that movement of lower chamber 4 from the receiving position to the withdrawal position includes movement therewith of rollers 71 and the portion of pathway 73 which is within chamber 4, this portion thus becoming in the withdrawal position a removal pathway which finished ingot 86 travels along and out of during removal of ingot 86 from interior chamber 70. Chamber 4 and the portion of pathway 73 within chamber 4 in the withdrawal position is thus at an angle to the receiving position of chamber 4 and pathway 73 respectively. Relative to chamber 4, the direction of movement of finished ingot 86 during removal from chamber 4 is thus opposite the direction of movement of finished ingot 86 into chamber 4 in the receiving position during the lowering of ingot 86 via rollers 60 and 71 during casting.

The opening of lower isolation valve 66 may be done without first removing inert gas from lower chamber 70 although doing so allows the escape and loss of the inert gas. Thus, alternately, while upper and lower isolation valves 64 and 66 remain closed, the inert gas within lower chamber 70 may be evacuated by the one or more pumps 78 which are in fluid communication with chamber 70. The inert gas can then be retained and reused within the furnace. After finished ingot 86 is removed from interior chamber 70, chamber 4 is moved or returns from the withdrawal position to the receiving position. This is typically achieved by pivoting (Arrow G in FIG. 5) upper end 10 about pivot 74 so that chamber 4 becomes vertical and upper end 10 is vertically aligned with and directly below lower end 8, then operating lift 69 to raise or move chamber 4 upwardly to reconnect ends 8 and 10 to one another via the above-described face seal, with this re-connection again forming the essentially gastight seal between chambers 2 and 4.

Once chambers 2 and 4 are reconnected, lower interior chamber 70 is evacuated and backfilled with inert gas. In particular, upper valve 64 is still closed and lower valve 66 is closed to seal lower chamber 70 from external atmosphere. With both valves 64 and 66 closed, lower interior chamber 70 is evacuated by one or more pumps 76 in fluid communication therewith to essentially remove all gases therefrom, and chamber 70 is then backfilled with inert gas from the one or more sources 78 in fluid communication therewith. Once chamber 70 is refilled with inert gas to provide therein an inert gas atmosphere therein, upper and lower isolation valve 64 and 66 are opened (opposite Arrow E in FIG. 4), thereby once again forming the single sealed furnace interior chamber which is essentially made up of upper and lower chambers 20 and 70 and which is filled with inert gas.

Unfinished ingot 88 remains within sealed upper chamber 20 and the casting of unfinished ingot 88 continues via pouring additional molten metal 83 from hearth 52 into mold 54 and the lowering (Arrow J in FIG. 5) of unfinished ingot 88 throughout the time period in which: finished ingot 86 is within sealed lower interior chamber 70; lower chamber 4 is moved from the receiving position to the withdrawing position including disconnecting/lowering chamber 4 from chamber 2 from the receiving to the non-withdrawal position, breaking the seal therebetween, and pivoting chamber 4 from the non-withdrawal to the withdrawal position; finished ingot 86 is withdrawn from chamber 4; lower chamber 4 is moved from the withdrawal position to the non-withdrawal position to the receiving position, thus including the corresponding pivoting and raising of chamber 4; upper and lower chambers 2 and 4 are reconnected and resealed to one another; lower interior chamber 70 is evacuated and backfilled with inert gas; and isolation valves 64 and 66 are opened to open or reopen fluid communication between interior chambers 20 and 70 to again form the single sealed furnace interior chamber. To allow this to occur, furnace 1 is configured with sufficient space below cutter 62 and above upper isolation valve 64. More particularly, cutter 62 and upper valve 64 define therebetween a vertical length of a portion of pathway 73 which is sufficiently long to allow the lower end of unfinished ingot 88 to move downwardly of cutter 62 while remaining spaced upwardly of door 65 of upper valve 64 throughout the above-noted time period.

Thus, once valves 64 and 66 are opened again, the casting process continues to proceed with the pouring of molten metal into mold 54 and the lowering of unfinished ingot 88 so that unfinished ingot 88 also becomes long enough and extends downwardly of cutter 62 far enough to be cut into another finished ingot essentially identical to finished ingot 86. The steps following the cutting process are then likewise repeated in order to remove the additional finished ingot from chamber 4 and continue forming yet another finished ingot thereafter, and so forth.

Figure 6:
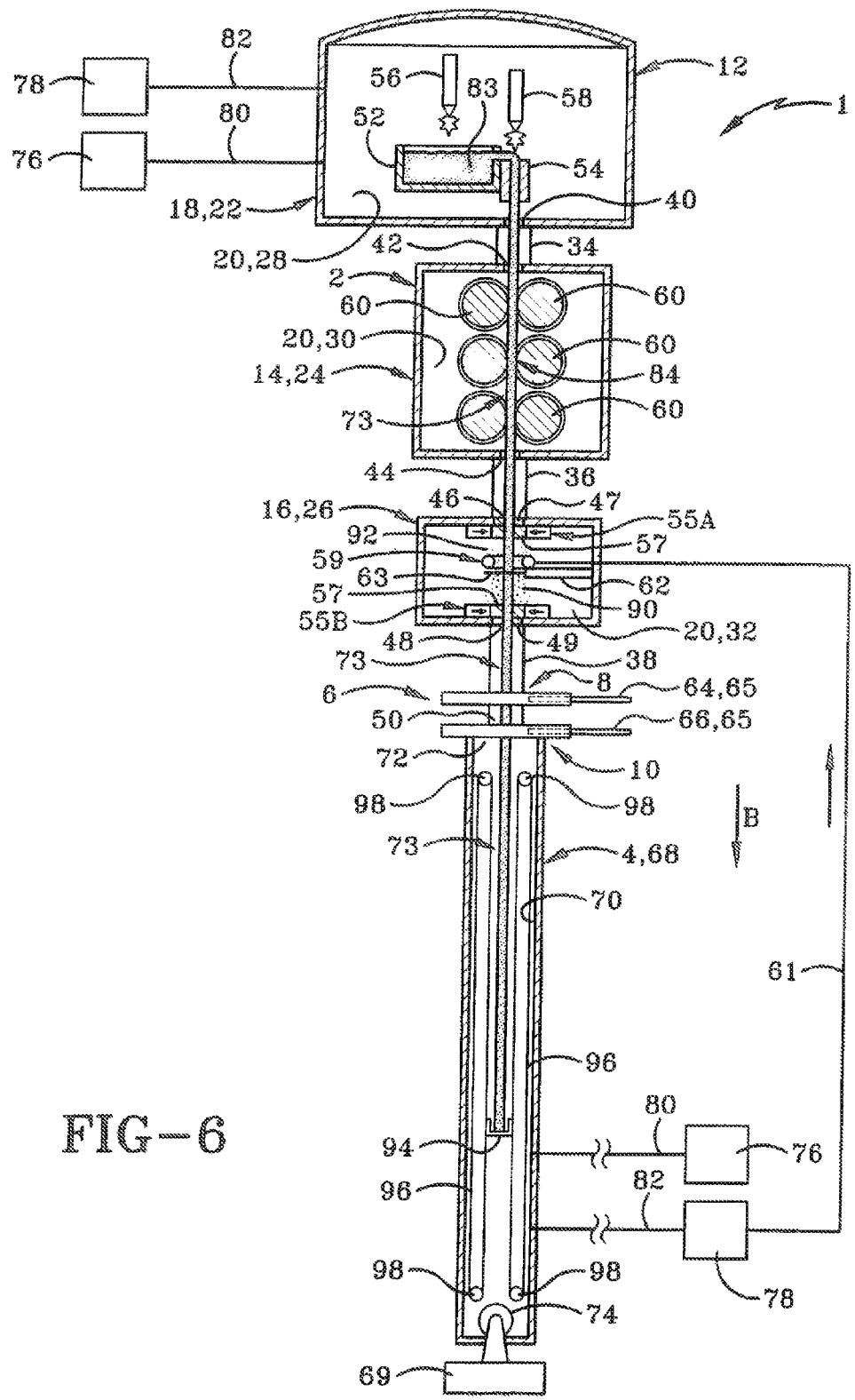
FIG. 6 is similar to FIG. 3 and shows a second example continuous casting furnace at the same stage of operation as FIG. 3.
Figure 7:
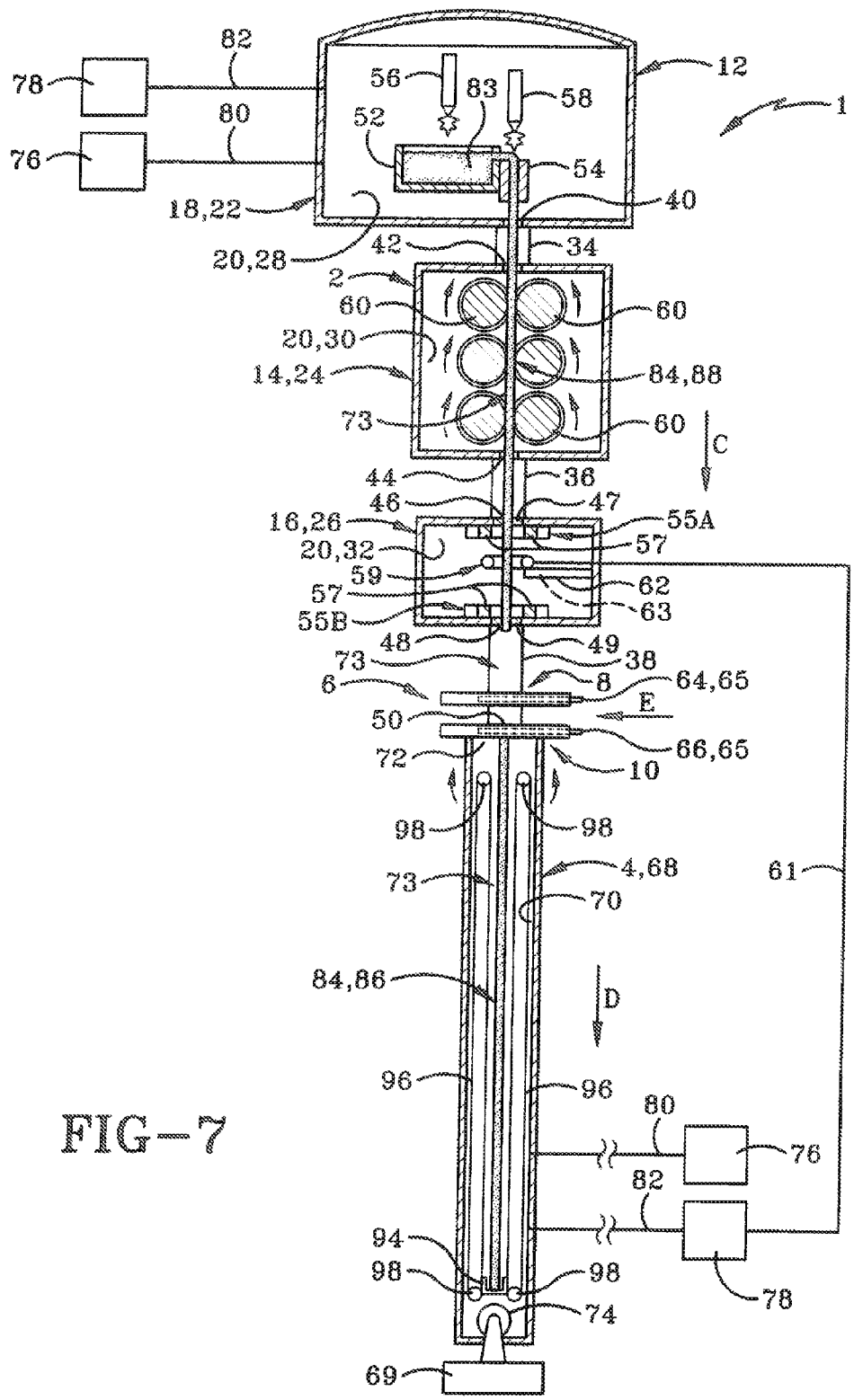
FIG. 7 is similar to FIG. 6 and shows the second example furnace at the same stage as FIG. 4.
Figure 8:
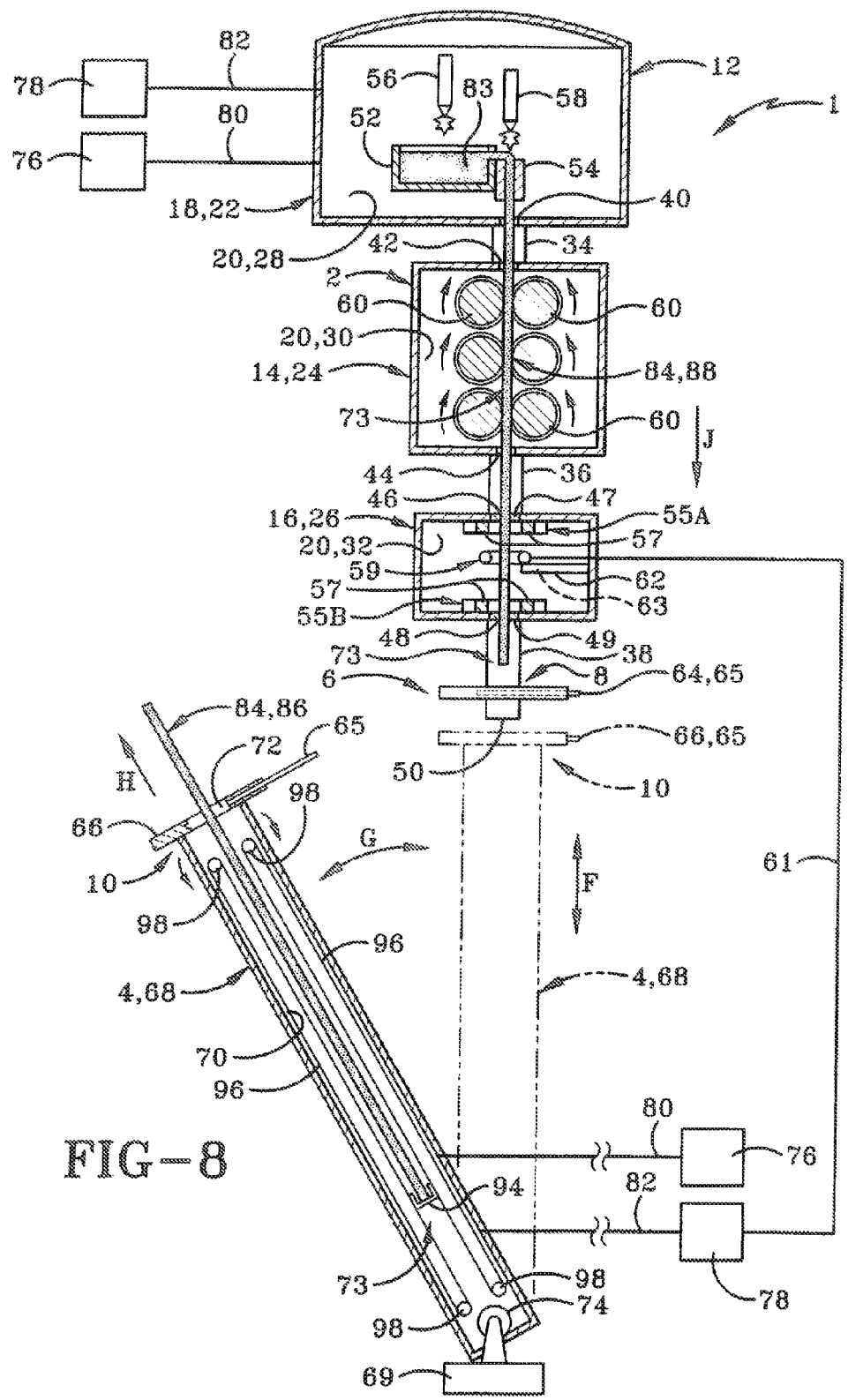
FIG. 8 is similar to FIG. 7 and shows the second example furnace at the same stage as FIG. 5.

FIGS. 6-8 show furnace 1 includes within space 70 of lower chamber 4 a modified lower metal casting or ingot lift or lowering mechanism, which may also serve as a metal casting or ingot withdrawal mechanism or part of such a withdrawal mechanism. This lower ingot lift includes a rigid metal casting or ingot support 94 shown here generally cup-shaped member which is mounted on a pair of flexible closed loops 96 which may be in the form of chains 96 which are revolvingly mounted on and revolvable about respective upper and lower rotatable members 98 or wheels which may be in the form of sprockets although one skilled in the art will appreciate that similar closed loops and rotatable members may be used. Each loop or chain 96 includes substantially straight inner and outer segments which extend from the respective upper sprocket to the respective lower sprocket, so that the ingot support 94 is secured to and extend between the inner segments of the two chains 96.

At least one of the sprockets that each chain engages is a driven sprocket which is driven by a motor to rotate the driven sprocket, which causes the corresponding chain to revolve around its upper and lower sprockets. Thus, rotation of the driven sprocket in a first rotational direction causes the chain mounted thereon to revolve in a first revolving direction with the inner segment of the chain moving in a first inner segment direction, whereas rotation of the driven sprocket in a second opposite rotational direction causes the chain mounted thereon to revolve in a second opposite revolving direction with the inner segment of the chain moving in a second opposite inner segment direction. Ingot support 94 moves with the chain inner segments in the corresponding inner segment direction.

FIGS. 6 and 7 show lower chamber 4 in the receiving position while FIG. 8 shows lower chamber in the withdrawal position. The lower ingot lift, including support 94, chains 96 and sprockets 98, thus moves with lower chamber 4 between the receiving and withdrawal positions. The inner and outer straight segments of chains 96 are substantially vertical in the receiving position, and angle upwardly and to the side in the withdrawing position. The lower sprockets 98 have withdrawing positions when lower chamber 4 is in its withdrawing position and receiving positions when lower chamber 4 is in its receiving position. Likewise, the upper sprockets 98 have withdrawing positions when lower chamber 4 is in its withdrawing position and receiving positions when lower chamber 4 is in its receiving position. The withdrawing positions of lower sprockets 98 are different from and adjacent the receiving positions of the lower sprockets. However, the withdrawing positions of upper sprockets 98 are different from and distal the receiving positions of the upper sprockets. In the receiving position, the lower portion of metal casting pathway 73 is substantially vertical and disposed between the inner segments of chains 96. In the withdrawing position, the lower portion of metal casting pathway 73 angles upwardly and to the side and is disposed between the inner segments of chains 96.

The overall operation of furnace 1 described above is essentially the same when using the modified lower ingot lift except for the differences between the ingot lift using rollers 71 and the modified lift using chains 96. Thus, for the most part, only these differences are described hereafter. As casting 84 moves into lower chamber 4, the bottom of metal casting 84 comes into contact with ingot support 94, at which time the lower ingot lift is operated to move support 94 downwardly at the same lowering rate as the lowering rate of the upper lift having upper rollers 60. As shown in FIG. 6, support 94 henceforth supports part of the weight of casting 84 and the bottom of casting 84 remains in contact with an upwardly facing surface of support 94 as casting 84 is further lowered.

When casting 84 is sufficiently long and lowered sufficiently, the upper and lower lifts are typically stopped to stop the lowering movement of casting 84, at which time (as shown in FIG. 6) clamping assemblies 55 clamp casting 84 and cutter 62 cuts casting 84 as previously discussed to form finished ingot 86 and unfinished ingot 88. Casting 84 may also be heated or cooled by temperature control device 59 as previously discussed. Unlike lower rollers 71, which clamp casting 84 during the cutting process, the modified lower ingot lift does not clamp casting 84 during the cutting process, nor at any time. Once casting 84 has been completely cut in two by cutter 62 to form unfinished and finished ingots 86 and 88 and clamping assemblies 55 have moved back to their non-clamping positions (FIG. 7), upper rollers 60 clamp unfinished ingot 88 to secure ingot 86 and the lower ingot lift supports the full weight of finished ingot 86 with the bottom of ingot 86 seated atop support 94. After casting 84 is cut, the lower ingot lift controls the lowering (Arrow D in FIG. 7) of finished ingot 86. More particularly, sprockets 98 are rotated (corresponding arrows in FIG. 7) in a lowering direction to lower finished ingot 86 more rapidly than the lowering rate of unfinished ingot 88 until finished ingot 86 is entirely within lower interior chamber 70.

Isolation valves 64 and 66 are then operated as previously discussed in preparation for removal of finished ingot 86 from lower chamber 4. Once chamber 4 is moved to its withdrawal position (solid lines in FIG. 8), and lower valve 66 is opened so that entrance opening 72 is exposed to external atmosphere to serve as an exit opening, finished ingot 86 is removed (Arrow H in FIG. 8) from interior chamber 70 as sprockets 98 are operated to rotate (corresponding arrows in FIG. 8) in a withdrawing direction opposite that used during the lowering of ingot 88, thereby moving the inner segments of chains 96, support 94 and ingot 88 in a withdrawing direction upwardly and to the side. The operation of the isolation valves, the evacuation and backfilling of lower chamber 4, the moving of chamber 4 from the withdrawal position to the receiving position and so forth is the same as previously described. The casting of unfinished ingot 88 may thus proceed accordingly.

Furnace 1 is thus configured to cast a metal casting in a continuous or non-stop manner except for any duration in which the lowering of the metal casting is stopped for cutting long enough to preclude the ability to pour molten metal into mold 54 without overflowing the top of the mold. As previously discussed, cutter 62 and clamping assemblies 55 may be movable in the downstream direction along with the metal casting while cutting the metal casting, which allows for a truly continuous or non-stop casting procedure during normal operation of furnace 1.

Various changes may be made to the furnace of the exemplary embodiment which are within the scope of the invention. One such aspect relates to manipulation of a lower chamber analogous to lower chamber 4. For instance, lower chamber 4 may be moved between the receiving and withdrawal positions in a manner that does not involve the shown pivotal movement of lower chamber 4, and may be moved in a manner that involves other structures and other types of movement. By way of example, lower chamber 4 can be mounted on a lift or other support that slides horizontally or otherwise to the side. An additional example includes use of a carousel which carries more than one lower chamber whereby, for instance, the carousel may be moved so that one of the lower chambers carried by the carousel may be disconnected and moved away from the lower end of upper chamber 2 for withdrawing the finished ingot while another one of the lower chambers on the carousel moves into a position with its receiving end or entrance opening aligned with the lower end or exit opening 50 of upper chamber 2 and connected to the lower end of chamber 2.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A continuous casting furnace comprising:
   a furnace interior chamber;
   a continuous casting mold disposed in the furnace interior chamber and adapted to form a metal casting;
   a metal casting pathway extending away from the mold and adapted to allow the metal casting to move downstream from the mold;
   a cutter disposed in the furnace interior chamber adjacent the metal casting pathway and adapted to cut the metal casting; and
   an annular barrier which is downstream of the cutter, which circumscribes the metal casting pathway on or adjacent an outer perimeter of the metal casting pathway and which is adapted to engage or lie adjacent an outer perimeter of the metal casting to prevent cuttings from falling past the barrier.

2. The furnace of claim 1 further comprising an isolation valve below the barrier.

3. The furnace of claim 1 further comprising a metal casting lift below the barrier and adapted to engage and lower the metal casting.

4. The furnace of claim 1 further comprising an additional annular barrier which is upstream of the cutter, which circumscribes the metal casting pathway on or adjacent an outer perimeter of the metal casting pathway and which is adapted to engage or lie adjacent an outer perimeter of the metal casting to prevent dust from moving upstream of the barrier.

5. The furnace of claim 4 further comprising a plurality of rollers which are in the furnace interior chamber upstream of the barrier and which are adapted to engage the metal casting.

6. The furnace of claim 1 wherein the cutter comprises one of (a) a plasma torch; and (b) a frame with a rigid cutting member movably mounted on the frame.

7. The furnace of claim 1 wherein the furnace interior chamber comprises a first chamber and a second chamber downstream of the first chamber;
   the mold is in the first chamber; and
   the second chamber is movable relative to the first chamber.

8. The furnace of claim 7 further comprising a pivot about which the second chamber is pivotally movable relative to the first chamber.

9. The furnace of claim 7 further comprising a chamber lift having raised and lowered positions; wherein the second chamber is carried by the lift.

10. The furnace of claim 7 wherein the second chamber has a connected position in which the second chamber is connected to the first chamber and a disconnected position in which the second chamber is disconnected from the first chamber.

11. The furnace of claim 7 wherein the second chamber is movable relative to the first chamber between a receiving position in which the second chamber is capable of receiving the metal casting from the first chamber and a withdrawal position in which the second chamber is not capable of receiving the metal casting from the first chamber.

12. The furnace of claim 7 further comprising
    an evacuation pump;
    a vacuum line extending from the pump to the second chamber;
    a source of inert gas; and
    a backfill line extending from the source of inert gas to the second chamber.

13. The furnace of claim 1 further comprising a hearth in the furnace interior chamber in fluid communication with the mold.

14. The furnace of claim 13 further comprising a plasma torch above the hearth.

15. The furnace of claim 1 further comprising a plurality of rollers which are in the furnace interior chamber and adapted to engage the metal casting.

16. The furnace of claim 1 further comprising a clamp which is adjacent the cutter and has a clamping position in which the clamp is adapted to clamp the metal casting and a non-clamping position in which the clamp is adapted to be released from the metal casting.

17. The furnace of claim 1 further comprising a metal casting temperature control assembly which is adjacent the cutter and comprises at least one of a heating device for heating the metal casting and a cooling device for cooling the metal casting.

18. The furnace of claim 1 wherein the furnace interior chamber comprises a first chamber and a second chamber downstream of the first chamber; and
    the mold is in the first chamber; and further comprising
    a first isolation valve having an open position in which the first and second chambers are in fluid communication with one another and a closed position in which communication between the first and second chambers is closed.

19. The furnace of claim 1 further comprising a vacuum pump in fluid communication with the furnace interior chamber.

* * * * *